Oct. 20, 1936.  R. J. DOWLING ET AL  2,057,769
CUTTING TOOL
Filed Jan. 9, 1933
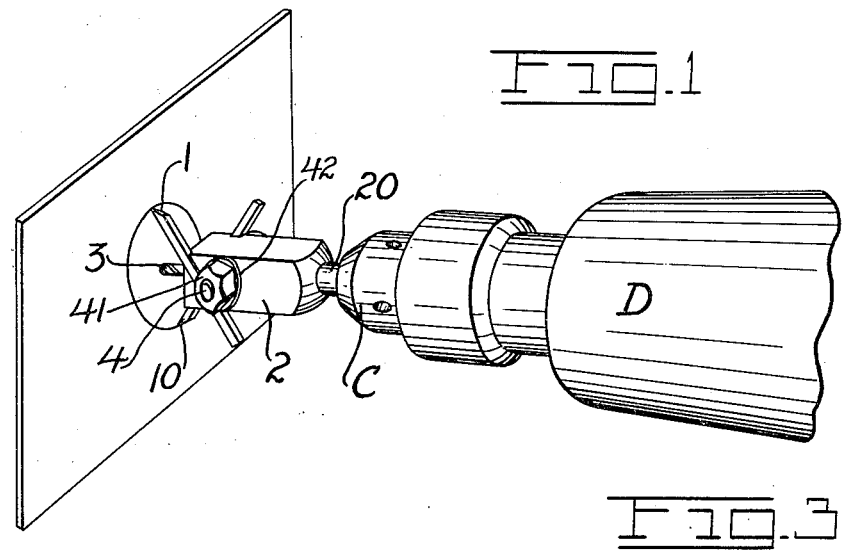
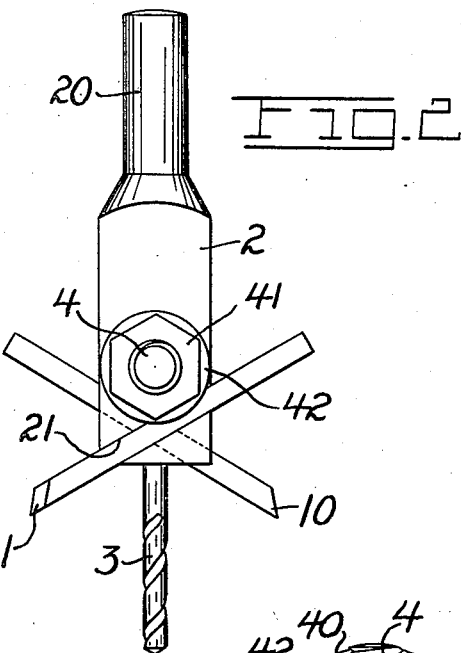
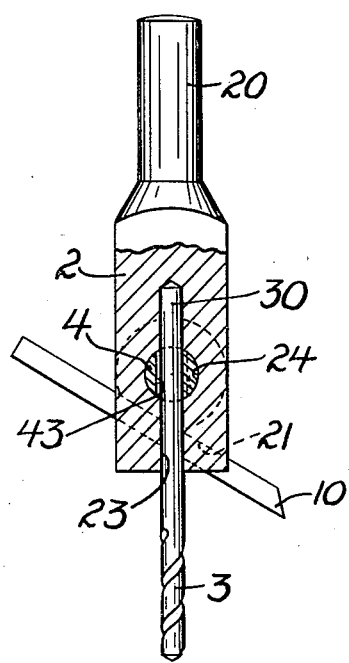
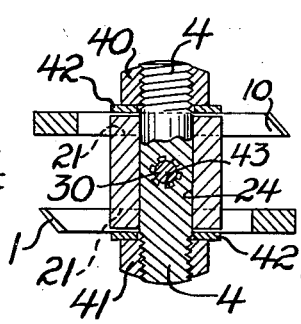
Reginald J. Dowling
Charles D. Davidson
INVENTORS
BY Charles L. Reynolds
ATTORNEY Patented Oct. 20, 1936

2,057,769

UNITED STATES PATENT OFFICE 2,057,769

CUTTING TOOL

Reginald J. Dowling and Charles D. Davidson, Seattle, Wash.

Application January 9, 1933, Serial No. 650,788

5 Claims. (Cl. 77—69)

Many occasions arise in working with sheet metal where it is desirable to cut a hole larger than can be made with a drill, and perhaps of a size which is not readily made by any tool which is available for the purpose, yet it may not be feasible to employ cutters, punches, or the like. For instance, the work to be done may be the installation of a dial in an automobile dashboard, or the cutting through the cowl to install a water heater and pipes therefor. Heretofore in accomplishing such work it has been customary to cut a number of small holes so that the metal between could be sufficiently weakened to knock out the center, and then it was necessary to finish up the edges of the hole.

It is the object of our invention to avoid the tedious work, the makeshift fitting, and the excessive time required in such work, and to provide a tool whereby such a piece of metal can be cut out in one operation, in which operation the hole is accurately centered, and the work can be performed by small portable tools.

It is also an object to devise such a tool which can be adjusted to cut various sizes of holes.

It is a further object to employ in such a tool a pilot drill and cutting tools, and to provide a single means for holding both the drill and the cutting tools in their definitely fixed positions in the tool body.

It is also an object to devise a tool of the character described which shall be simple and inexpensive in construction.

Our invention comprises the novel tool, and the novel combination and arrangement of the parts thereof, as shown in the accompanying drawing, described in this specification, and as will be more particularly pointed out by the claims which terminate the same.

In the accompanying drawing we have shown our invention in a form which is at present preferred by us.

Figure 1 is a perspective view showing the tool in operation.

Figure 2 is a side elevation of the tool, and Figure 3 is an axial section through the same.

Figure 4 is a transverse section through the tool along the axis of the clamping bolt.

The elements which accomplish the cutting of the hole may conveniently be a cutting tool or tools, which to distinguish them may be designated 1 and 10, but which are alike and are oppositely angularly positioned relative to the axis of the hole to be bored. Preferably the points of the cutting tools 1 and 10 are so positioned as to be at opposite ends of a diameter of such hole to be cut.

To hold the cutting tools 1 and 10 in this position we may support them in a tool body 2 which has channels or guideways 21 upon opposite flat faces, these guideways 21 being angularly disposed with respect to the axis of the tool body 2. At one end the tool body has a shank 20 for reception in the chuck C of a tool by means of which it can be rotated, for instance the portable power drill D. A hand brace may be employed if desired.

In order to guide the tool body 2, and consequently the cutting tools 1 and 10, and accurately to center the hole which is to be cut, in advance of the actual cutting but as part of the single operation, we provide a pilot drill 3 projecting forwardly from the tool body 2 in advance of the circle representing the path of movement of the points of the cutting tools 1 and 10. In other words, the points of these tools are behind the point of the drill 3. To support the drill its shank 30 may be received within an axial bore 23 in the supporting body 2 at the end opposite the shank 20 thereof.

In order to hold the cutting tools 1 and 10 in position, and in order to hold the drill 3 in place, we prefer to use a single means which will accomplish both ends. We therefore provide a transverse hole 24 in the supporting body 2, this being located adjacent the channels 21. In this hole 24 is received a clamping bolt 4. The hole 24 is intersected by the smaller bore 23, and in order to receive the shank 30 of the drill we provide a transverse hole 43 in the clamping bolt 4, which can be brought into registry with the bore 23, and is of a size to receive the drill shank 30. The drill shank preferably passes entirely therethrough, and for better gripping the hole 43 may be formed with splines facing toward the shank of the drill, or these splines may be omitted. By slight endwise movement of the clamping bolt 4 the drill shank 30 is pinched and held in place.

The channels 21 are of such depth that the tools 1 and 10 project slightly above the flat surfaces in which the channels are formed, and they are therefore engageable by clamping nuts 40 and 41 threaded upon the opposite ends of the bolt, or by washers 42 interposed between such nuts and the tools 1 or 10, as the case may be. It is evident, of course, that a head might be formed on one end of the clamping bolt 4, and a nut could be formed upon the other end only, but in order that both the drill shank 30 and the two cutting tools 1 and 10 may at the same time be securely clamped in place we prefer that the nuts be employed on both ends of the clamping bolt.

In order to prepare the tool for use, a drill shank is inserted through the bore 23 and the hole 43, the clamping bolt being received at the time in its hole 24. Now the cutting tools 1 and 10 are received in their respective channels 21, and their points are spaced, in a common plane normal to the tool's axis, sufficiently from such axis to cut a circle of the desired size. Parts being held in this position, the clamping nuts 40 and 41 are drawn up in turn. Drawing up the first nut, say the nut 40, securely holds the cutting tool 10 and the drill shank 30 in place, and when the second nut 41 is screwed home it clamps the cutting tool 1 in position without disturbing the securement of the other cutting tool, 10, and the drill 3.

What we claim as our invention is:

1. In combination, a supporting body having means whereby it may be rotated, and having an axially disposed hole at one end, and two guideways in planes disposed in parallel relation at opposite sides of said hole, and making opposite acute angles with a plane normal to said hole, a pilot drill received in said hole, a cutting tool received in each of said guideways, the points whereof lie in a common circle about the drill and behind the latter's point, a clamping bolt extending transversely through the supporting body, and itself having a transverse hole adapted to receive the shank of the drill, and means upon the ends of the bolt for engaging and securing in position the cutting tools, and for drawing the bolt against the drill shank, to secure the latter.

2. In combination, a supporting body having means whereby it may be rotated, and having opposite flat faces and an axially disposed hole at one end, said flat faces having channels making opposite acute angles with a plane normal to said hole, a bolt extending through the supporting body from one flat face to the other, and projecting adjacent to said channels, said bolt having a transverse hole adapted to register with the axial hole in the supporting body, a pilot drill the shank of which is received in each of said holes, whereby upon axial movement of the bolt the drill is secured in place, a cutting tool received in each channel and projecting above the flat face, and nuts received on the ends of the clamping bolt and engaging the adjacent cutting tools, to clamp the latter in place and to secure the drill.

3. The combination of claim 2, wherein the drill-shank-receiving hole in the clamping bolt has a splined surface to engage the drill shank.

4. In combination, a supporting body having means whereby it may be rotated, and having two guideways in planes disposed in parallel relation at opposite sides of said body, and making opposite acute angles with a plane normal to the axis of said body, a pilot drill supported axially in said body, a cutting tool received in each of said guideways, the points whereof lie in a common circle about the drill and behind the latter's point, and means including a member common to the two cutters to secure the same in adjusted position in said guideways.

5. In combination, a supporting body having means whereby it may be rotated, and having two guideways in planes disposed in parallel relation at opposite sides of said body, and making opposite acute angles with a plane normal to the axis of said body, a pilot drill supported axially in said body, a cutting tool received in each of said guideways, the points whereof lie in a common circle about the drill and behind the latter's point, and a threaded member extending into said body and provided with means for clamping said cutting tools.

REGINALD J. DOWLING.
CHARLES D. DAVIDSON.